(12) United States Patent
Pelton

(10) Patent No.: US 7,117,634 B2
(45) Date of Patent: Oct. 10, 2006

(54) TREE SEEDLING PLUG AND METHOD OF MAKING SAME

(76) Inventor: Norman R. Pelton, 12930 - 203rd Street, Maple Ridge, British Columbia (CA) V2X 4N2

( * ) Notice: Subject to any disclaimer, the term of this patent is extended or adjusted under 35 U.S.C. 154(b) by 0 days.

(21) Appl. No.: 09/738,766

(22) Filed: Dec. 18, 2000

(65) Prior Publication Data

US 2002/0073616 A1    Jun. 20, 2002

(51) Int. Cl.
*A01G 9/10* (2006.01)

(52) U.S. Cl. .............................. 47/77; 47/66.7; 47/73; 47/58.1 SC

(58) Field of Classification Search .................. 47/73, 47/32, 65, 66.6, 58.1, 62 R, 74–78, 9
See application file for complete search history.

(56) References Cited

U.S. PATENT DOCUMENTS

| | | | | |
|---|---|---|---|---|
| 3,722,139 A |   | 3/1973  | Pelton ............................. | 47/58 |
| 3,842,537 A | * | 10/1974 | Bishop ............................ | 47/37 |
| 3,990,180 A | * | 11/1976 | Bunting ........................... | 47/37 |
| 4,333,265 A | * | 6/1982  | Arnold ............................ | 47/74 |
| 4,420,903 A | * | 12/1983 | Ritter et al. ..................... | 47/81 |
| D325,714 S  | * | 4/1992  | Karhiniemi et al. ........... | D11/155 |
| 5,331,908 A | * | 7/1994  | Loeb ............................... | 111/114 |
| 5,942,029 A | * | 8/1999  | Spittle ......................... | 106/164.3 |
| 6,219,968 B1| * | 4/2001  | Belger et al. ..................... | 47/4 |

FOREIGN PATENT DOCUMENTS

| | | | |
|---|---|---|---|
| DE | 1949462 | * | 10/1969 |
| EP | 0117766 | * | 9/1984 |
| EP | 0172060 |   | 2/1986 |
| FR | 2630293 |   | 10/1989 |
| JP | 405137473 A | * | 6/1993 |
| WO | WO 85/03191 |   | 8/1985 |

OTHER PUBLICATIONS

Trade Mark Scan, Van der Knapp, Fibre Neth, Dec. 23, 1997, one page.*
Van der Knapp web page www.potgrond.com, Fibre-Neth Holland BV, 9 pages.*
Substrate Research for Roses: Evaluation of Different Types of coir, Verbondsnieuws vol. 43 (20): English abstact, Dutch 1999, one page.*

* cited by examiner

*Primary Examiner*—Andrea M. Valenti
(74) *Attorney, Agent, or Firm*—Oyen Wiggs Green & Mutala LLP

(57) ABSTRACT

A method of making tree seedling plugs which permits the plug to be transplanted earlier is provided. The tree seeds are planted in a structured soil growing medium, and a miniplug is formed which may is then transferred to a standard size growing cell for further development to form the plug.

16 Claims, 5 Drawing Sheets

TREE SEEDLING PLUG AND METHOD OF MAKING SAME

TECHNICAL FIELD

The invention relates to plugs for planting tree seedlings, and to methods of making same.

BACKGROUND ART

Reforestation of coniferous forests after logging or forest fires is generally accomplished by tree planting by hand. Tree planters, on foot and carrying a supply of tree seedlings, form holes in the soil using a tool called a mattock and insert a tree seedling into the hole, and the soil is pressed around the roots of the seedling by the planter. Due to the nature of coniferous forests, such re-planting is often carried out on rugged terrain, in difficult soil conditions. Also, such forests are typically in a northern climate with a short growing season. There is therefore a short window during which the re-planting of seedlings has the maximum chance for success, when the soil is sufficiently warm and moist with a long enough season remaining for the roots of the seedling to develop enough for survival.

Previously, tree seedlings were grown for up to three years in a nursery and then transplanted with bare roots. The disadvantages of such "bare root" planting of tree seedlings have been outlined in the present inventor's prior U.S. Pat. No. 3,722,139. Bare root replanting of tree seedlings has a high failure rate, since the soil into which the seedling is planted may have been overly harsh, cold or dry and the seedling roots may not have time to develop adequately in a short growing season. Consequently a method of growing seedlings in a soil plug called "styroblock plugs" has been developed. The soil plug can be planted using a dibble rather than a mattock. According to the current method, styrofoam trays or blocks having an array of cylindrical cavities are used. The cavities are filled with a loose growing soil mixture consisting of peat moss, sawdust and additives covered with loose sand. Generally two tree seeds are placed in each cavity. The trays are then placed in a greenhouse for the seed to germinate in warmth and light. After about 7 months the roots of the seedling have sufficiently developed to hold the growing medium together, forming a plug. At that point the seedlings are ejected from the styrofoam blocks and wrapped and packed for shipping or storage. In this way the roots of the seedling when planted are assured of a moist growing medium.

There remain difficulties with this present method, however. Roots of seedlings which have sufficiently developed in the cavity to retain the growing medium are not ideally configured for replanting as they form a ball which is unstable when replanted, and the growing seedling may be blown over in the wind. This is particularly a problem with certain species such as lodgepole pine. It is preferable to have the seedling roots develop naturally by penetrating into the upper layers of humus. Further, a long growing time is required to allow the seedling roots to develop according to this method, typically a minimum 7 months. Generally the seedlings will be planted in Jan. and shipped in Jul. However Jun. is often a preferable month for planting in order to minimize failures. Consequently there is a need for a method of forming a seedling plug which permits transplanting at an earlier stage of development of the seedling root system.

DISCLOSURE OF INVENTION

The invention therefore provides a tree seedling plug comprising a tree seedling having roots, and a cylindrical plug of growing medium surrounding said roots, wherein said growing medium comprises a network of thermal-sensitive fibre. According to a further aspect, the invention provides a tree seedling plug comprising a tree seedling having roots, and a first cylindrical plug of a first growing medium surrounding said roots, wherein said first growing medium comprises a network of thermal-sensitive fibre, and further comprising a second cylindrical plug of a second growing medium surrounding said first cylindrical plug.

The invention further provides a method of forming a seedling plug comprising i) filling a hollow cell with a growing medium wherein said growing medium comprises a network of thermal-sensitive fibre; ii) planting a tree seed in said hollow cell; iii) germinating said seed into a seedling and nurturing said seedling to provide root development; iv) after sufficient root development of said seedling has occurred, ejecting said seedling and growing medium to form said plug.

The invention further provides a method of forming a seedling plug comprising: i) forming a first cylindrical plug of a first growing medium wherein said first growing medium comprises a network of thermal-sensitive fibre, by a) filling a hollow cell with a growing medium wherein said growing medium comprises a network of thermal-sensitive fibre; b) planting a tree seed in said hollow cell; c) germinating said seed into a seedling and nurturing said seedling to provide root development; d) after sufficient root development of said seedling has occurred, ejecting said seedling and growing medium to form said first cylindrical plug; ii) transplanting said first cylindrical plug into a hollow cell with a growing medium wherein said growing medium comprises a network of thermal-sensitive fibre; iii) after sufficient root development of said seedling has occurred, ejecting said seedling and growing medium to form said seedling plug.

The invention further provides a method of forming a seedling plug comprising: i) forming a first cylindrical plug of a first growing medium wherein said first growing medium comprises a network of thermal-sensitive fibre, by a) filling a hollow cell with a growing medium wherein said growing medium comprises a network of thermal-sensitive fibre; b) planting a tree seed in said hollow cell; c) germinating said seed into a seedling and nurturing said seedling to provide root development; d) after sufficient root development of said seedling has occurred, ejecting said seedling and growing medium to form said first cylindrical plug; ii) transplanting said first cylindrical plug into a hollow cell with a growing medium wherein said growing medium comprises a second growing medium; iii) after sufficient root development of said seedling has occurred, ejecting said seedling and growing medium to form said seedling plug.

BRIEF DESCRIPTION OF DRAWINGS

In drawings which disclose a preferred embodiment of the invention.

BEST MODE(S) FOR CARRYING OUT THE INVENTION a) Transplanted Mini-Plug

Figure 2:
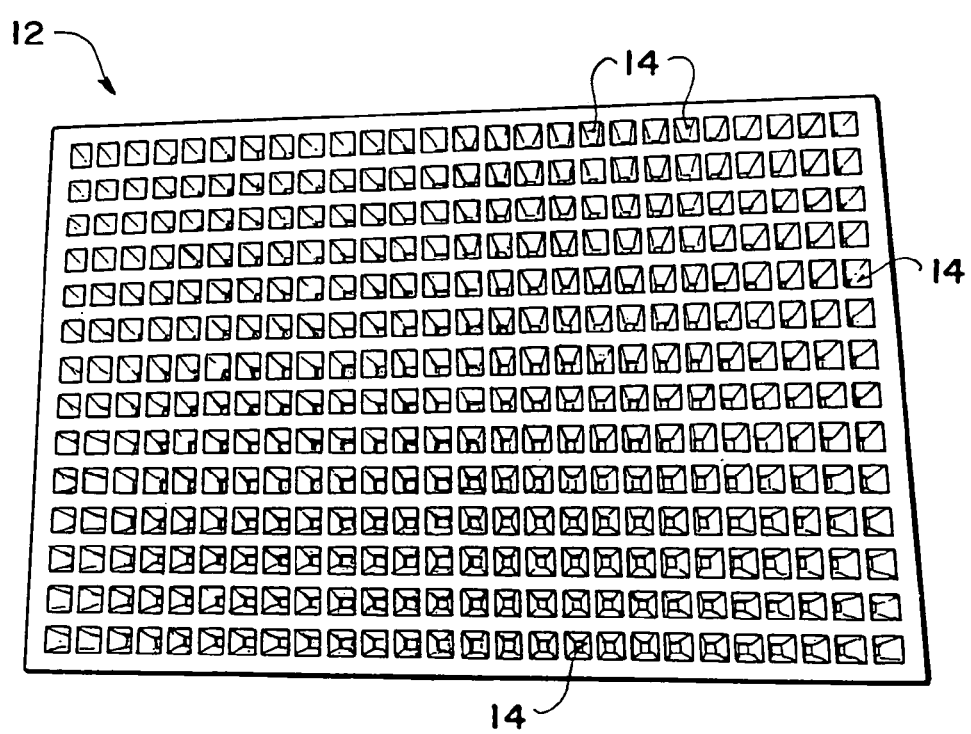
FIG. 2 is a perspective view of a mini-tray used in the invention.
Figure 3:
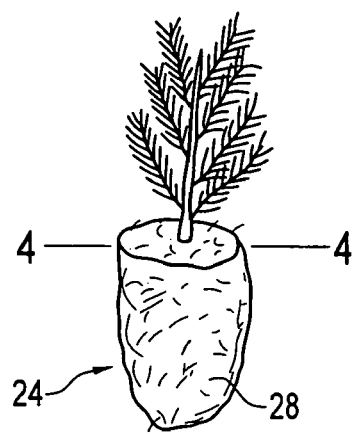
FIG. 3 is a perspective view of a mini-plug according to the invention.

In a first embodiment of the invention, a mini-plug 24 (FIG. 3) is first prepared for subsequent transplanting into a standard styroblock. A mini-tray 12 (FIG. 2) or block made of styrofoam having an array of cylindrical cavities 14, as shown in FIG. 2, is used. Unlike the standard styroblock 16 which has cells 18 having a diameter from 3 cm. to 6 cm. and depth from 10 cm. to 15 cm., the mini-tray 12 has cells 14 having a diameter approximately 1 cm and depth of 3 to 5 cm. Thus a mini-tray 12 as used in this invention has an array of 14 by 26 cylindrical cells or cavities 14, compared to the 8×14 array of cells 18 of a standard styroblock 16. A suitable mini-tray is manufactured by Synprodo of Holland. The cells 14 are filled with a loose growing soil mixture consisting of approximately 95% by weight coconut coir fibre, and 5% by weight of a fine, white, thermal-sensitive fibre substance manufactured and sold by Fibre-Neth Holland BV under the trademark FIBRE-NETH (referred to herein as "Fibre-neth"). The cells are compacted and a wobbler is used to dimple the top of the mixture to receive the seed. The tray 12 is then dipped in a bath of hot water at a temperature of 89 degrees Celsius. The tray is next dipped in a bath of water at tap water temperature, 5 to 10 degrees Celsius. Alternatively the water to heat and cool the tray may be cascaded onto the tray. The warm water causes the Fibre-neth fibres to soften and adhere to one another. The cold water then causes the fibres to harden in a net within the soil mixture. The trays 12 are then stored for later seeding.

Figure 1:
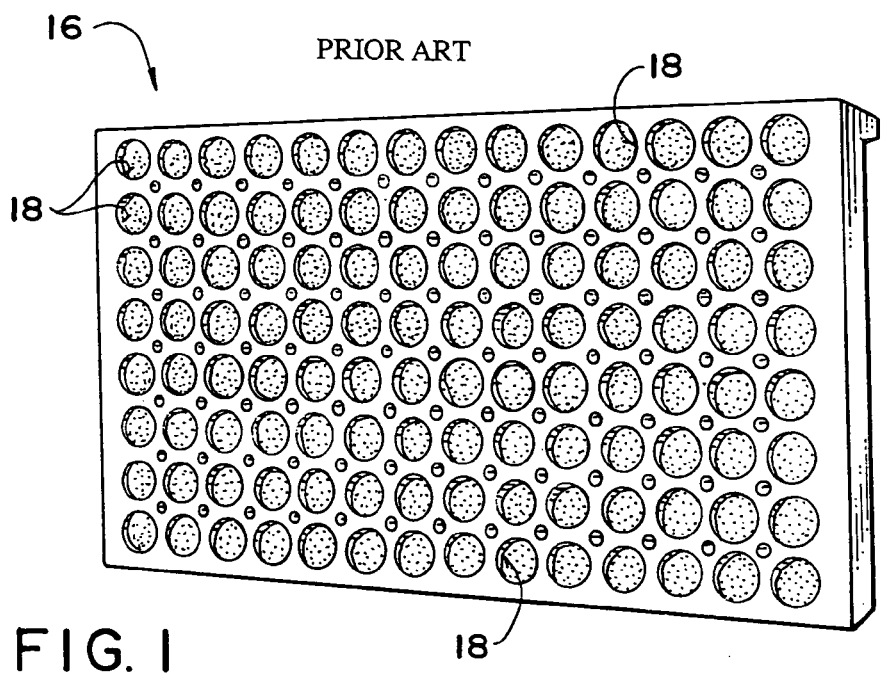
FIG. 1 is a perspective view of the current styroblock.
Figure 4:
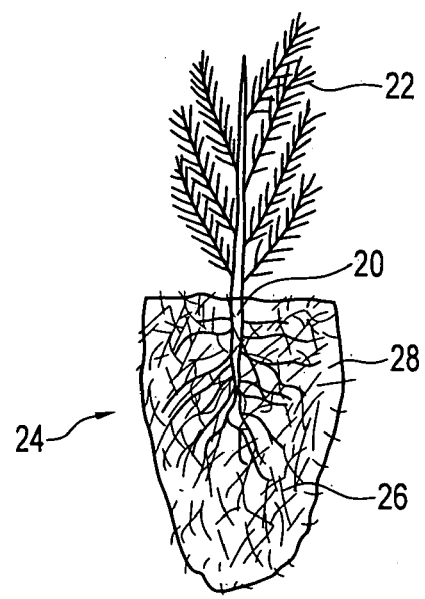
FIG. 4 is a cross-section view of the mini-plug shown in FIG. 3 taken along lines 4—4.
Figure 5:
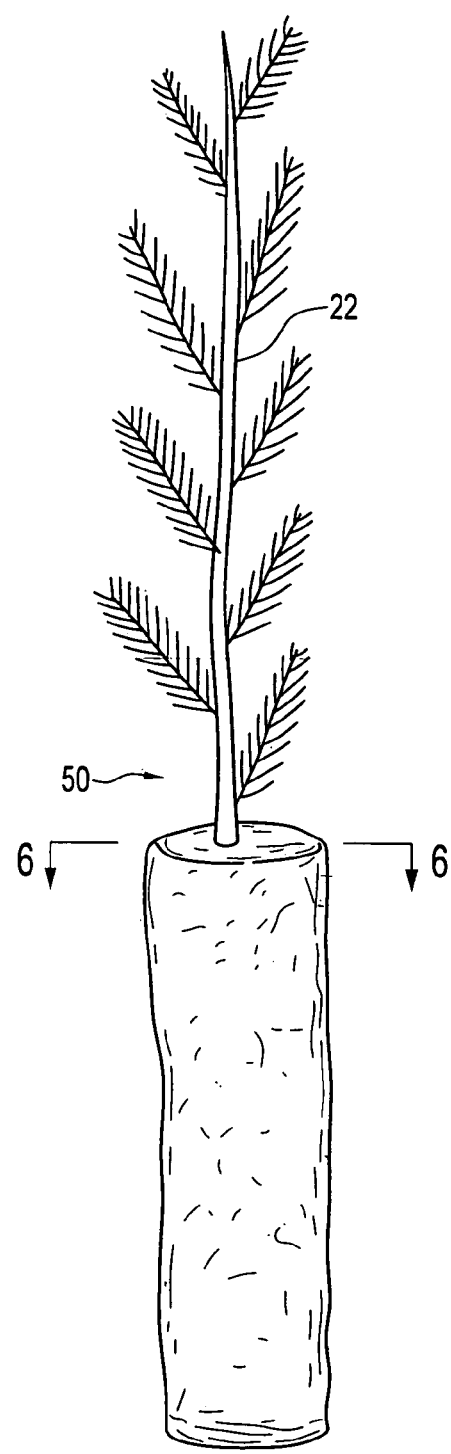
FIG. 5 is a perspective view of the finished seedling plug used in the invention.
Figure 6:
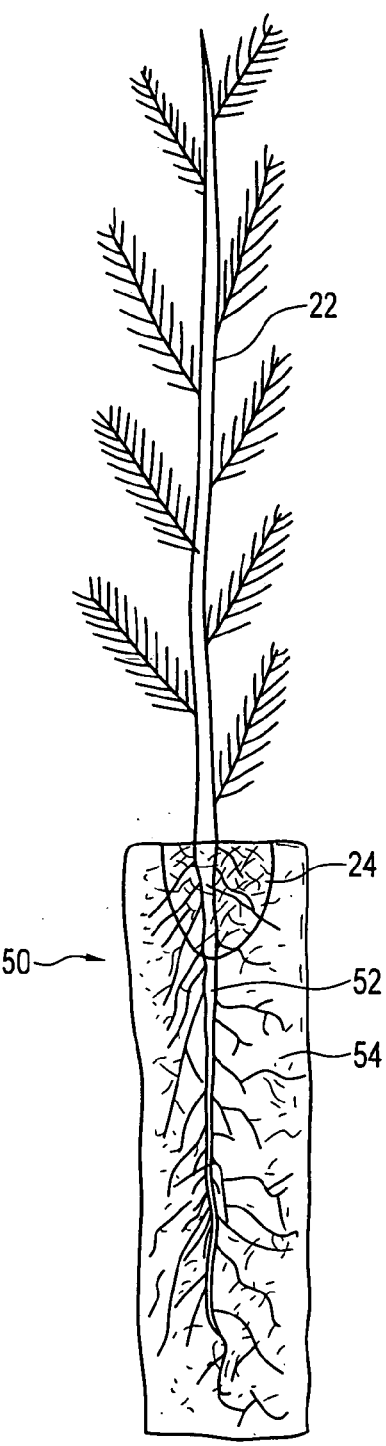
FIG. 6 is a cross-section view of the plug shown in FIG. 5 taken along lines 6—6.

To seed the trays, one tree seed is placed in each filled cell 14. Using this method there is therefore a saving in seed used, since one seed per cavity is sown rather than 2 or more as is done in prior methods. The trays 12 are then placed in a greenhouse for the seed to germinate in warmth and light. Using this method there is therefore a considerable saving in energy costs to produce heat and light, since the mini-trays have a much larger number of plants per square foot. After about 6 to 12 weeks the roots 20 of the seedling 22 (FIG. 4) have sufficiently developed to transplant as a miniplug 24, since the Fibre-neth 26 holds the growing medium 28 together, and provides a net 26 into which the tree roots can intertwine. The mini-trays 12 are then "gapped". A scanner (e.g. model no. T.I.S. of Visser International Trade & Engineering BV of Holland) determines which cavities are "blanks", without a germinated seed. These are blown out in Visser machine, such as the T.I.S. model, and replaced with nonblank plugs from another tray using a T.F.S. Visser machine, so that 100% of all trays are good plugs. The mini-plugs are then put back in the greenhouse and then up to 6 weeks later are transplanted into a standard styroblock having larger cells, as shown in FIG. 1. using a custom Visser machine model # PC4-14 or PC4-10. The cells 18 are filled with the loose growing medium of peat moss and sawdust 54 currently used. A cavity for mini-plug 24 to be inserted into by the transplant machine is formed in the medium by drilling or wobbling. The trays are then returned to the greenhouse or put outside for at least another 3 months. At that point, as in the existing method, the full seedling plugs 50 (FIG. 5 and 6) are ejected from the styroblocks 16 and wrapped and packed for shipping or storage. In this way the plug 50 has reached a stage where the roots 52 are sufficiently developed to retain the growing medium 54 in a plug after a shorter growing period than the current method, using less energy costs, less seed cost and with a more natural root development.

In a variation of the invention, the mini-plugs 24 described above can be transplanted into larger plugs formed to include the same Fibre-neth material described above. Trays having slits (LANNEN side-slot PLANTEK-F trays having 63 cavities of 90 ml.) are used to prepare the growing medium. Each cavity is partially filled with the medium described above, a loose mixture of 95% COIR by weight and 5% Fibre-neth. The trays are lowered into first the hot water bath, then cool water bath as described above to cook and set the fibres. The mini-plugs as described above are then transplanted into the trays and processed as previously described. In this case, the growing medium is held together at an earlier stage as the seedling roots intertwine with the fibre network.

b) Standard-Size Plug with Structured Soil

Figure 7:
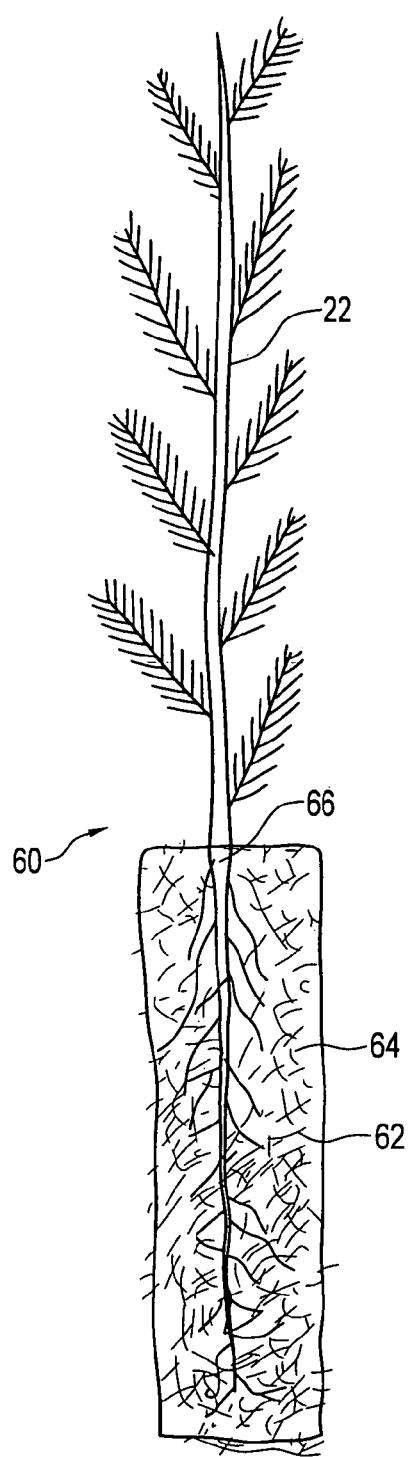
FIG. 7 is a cross-section view of a plug according to a further embodiment of the invention.

According to a second variation of the invention, the mini-plug step is skipped, and the tree seed is planted directly into cavities of structured soil. A styroblock tray 16 or LANNEN side slit trays as above are prepared with the structured soil mixture. One seed per cavity is planted. After 6-12 weeks, blanks are blown out and replaced with good plugs. The full trays are then put back in the greenhouse/outside for a minimum further 3 months. At that point, as in the existing method, the full seedling plugs 60 (FIG. 7) are ejected from the styroblocks 16 and wrapped and packed for shipping or storage. These plugs again will be capable of use for replanting sooner than current methods as the net 62 formed in the structured soil holds the growing medium 64 together with roots 66 at an earlier stage of root development.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of forming a coniferous tree seedling plug for use in re-planting coniferous forests comprising:
   i) filling a hollow cell of a tray of hollow cells with a growing medium wherein said growing medium comprises a plurality of thermal-sensitive fibres;
   ii) heat-treating said thermal-sensitive fibres to form an interconnected fibrous network within said growing medium by dipping said tray in a bath of hot water at a temperature of approximately 89 degrees Celsius, and then dipping said tray in a bath of water at tap water temperature, 5 to 10 degrees Celsius;
   iii) planting a coniferous tree seed in said hollow cell;
   iv) germinating said coniferous free seed into a seedling and nurturing said seedling to provide root development;
   v) after less than 7 months and sufficient root development of said seedling has occurred, ejecting said seedling and growing medium from said hollow cell to form said coniferous tree seedling plug; and vi) packing said coniferous tree seedling plug for use in re-planting coniferous forests.

2. The method of claim 1 wherein said growing medium comprises a loose growing soil mixture consisting of approximately 95% by weight coconut coir fibre, and 5% by weight of thermal-sensitive fibre.

3. The method of claim 1 wherein said first growing medium comprising a network of thermal-sensitive fibre is formed by filling a tray of hollow cells with said growing medium, and alternatively cascading water onto the tray to heat and cool the tray.

4. The method of claim 1 wherein said seedling and growing medium are ejected from said hollow cell after 6 months or less.

5. A method of forming a coniferous tree seedling plug for use in re-planting coniferous forests comprising:
   i) forming a first generally cylindrical plug of a first growing medium wherein said first growing medium comprises a network of thermal-sensitive fibre, by
      a) filling a first hollow cell of a tray of hollow cells with a growing medium wherein said growing medium comprises a plurality of thermal-sensitive fibres;
      b) heat-treating said thermal-sensitive fibres to form an intercon-nected fibrous network within said growing medium by dipping said tray in a bath of hot water at a temperature of approximately 89 degrees Celsius, and then dipping said tray in a bath of water at tap water temperature, 5 to 10 degrees Celsius;
      c) planting a coniferous tree seed in said first hollow cell;
      d) germinating said coniferous tree seed into a seedling and nurturing said seedling to provide root development;
      e) after sufficient root development of said seedling has occurred, ejecting said seedling and growing medium from said first hollow cell to form said first generally cylindrical plug;
   ii) transplanting said first generally cylindrical plug into a second hollow cell wit a second growing medium wherein said second growing medium comprises a plurality of thermal-sensitive fibres which have been heat-treated to form an interconnected fibrous network;
   iii) after less than 7 months and sufficient root development of said seedling has occurred, ejecting said seedling and said first second growing media from said second hollow cell to form coniferous tree seedling plug; and
   iv) packing said coniferous tree seedling plug for use in re-planting coniferous forests.

6. The method of claim 5 wherein said first growing medium comprises a loose growing soil mixture consisting of approximately 95% by weight coconut coir fiber, and 5% by weight of thermal-sensitive fiber.

7. The method of claim 5 wherein said first and second growing media comprising a network of thermal-sensitive fibre is are formed by filling a tray of hollow cells with one of said growing media, and alternatively cascading water onto the tray to heat and cool the tray.

8. The method of claim 5 wherein said seedling and said first and second growing media are ejected from said second hollow cell after 6 months or less.

9. The method of claim 5 wherein said seedling and said first growing medium are ejected from said first hollow cell after between 6 and 12 weeks.

10. The method of claim 5 wherein said second growing medium comprises a loose growing soil mixture consisting of approximately 95% by weight coconut coir fibre, and 5% by weight of thermal-sensitive fibre.

11. A method of forming a coniferous tree seedling plug for use in re-planting coniferous forests comprising:
    i) forming a first generally cylindrical plug of a first growing medium wherein said first growing medium comprises a network of thermal-sensitive fibre, by
       a) filling a first hollow cell of a tray of hollow cells with a growing medium wherein said growing medium comprises a plurality of thermal-sensitive fibres;
       b) heat-treating said thermal-sensitive fibres to form an intercon-nected fibrous network within said growing medium by dipping said tray in a bath of hot water at a temperature of approximately 89 degrees Celsius, and then dipping said tray in a bath of water at tap water temperature, 5 to 10 degrees Celsius;
       c) planting a coniferous tree seed in said first hollow cell;
       d) germinating said coniferous tree seed into a seedling and nurturing said seedling to provide root development;
       e) after sufficient root development of said seedling has occurred, ejecting said seedling and growing medium from said first hollow cell to form said first cylindrical plug;
    ii) transplanting said first generally cylindrical plug into a second hollow cell with a growing medium wherein said growing medium comprises a second growing medium;
    iii) after less than 7 month and sufficient root development of said seedling has occurred,ejecting said seedling and said first and second growing media from said second hollow cell to form said coniferous tree seedling plug; and
    iv) packing said coniferous tree seedling plug for use in re-planting coniferous forests.

12. The method of claim 11 wherein said second growing medium comprises a loose growing soil mixture comprising peat moss and sawdust.

13. The method of claim 11 wherein said first growing medium comprising a network of thermal-sensitive fibre is formed medium comprising a network of thermal-sensitive fibre is formed by filling a tray of hollow cells with said growing medium , and alternatively cascading water onto the tray to heat and cool the tray.

14. The method of claim 11 wherein said seedling and said first and second growing media are ejected from said second hollow cell after 6 months or less.

15. The method of claim 11 wherein said seedling and said first growing medium are ejected from said first hollow cell after between 6 and 12 weeks.

16. The method of claim 11 wherein said first growing medium comprises a loose growing soil mixture consisting of approximately 95% by weight coconut coir fibre, and 5% by weight of thermal-sensitive fibre.

* * * * *